Jan. 21, 1969 H. J. CVETKO 3,423,542

TAPERED FINGERS FOR RESONANT PEAK DAMPING IN PIEZOELECTRIC TRANSDUCERS

Filed Jan. 28, 1965

INVENTOR.
HENRY J. CVETKO

BY Francis J. Klempay

ATTORNEY 3,423,542

TAPERED FINGERS FOR RESONANT PEAK DAMPING IN PIEZOELECTRIC TRANSDUCERS

Henry J. Cvetko, Conneaut, Ohio, assignor to The Astatic Corporation, Conneaut, Ohio, a corporation of Ohio Filed Jan. 28, 1965, Ser. No. 428,726
U.S. Cl. 179—100.41 6 Claims
Int. Cl. H04r 17/04

ABSTRACT OF THE DISCLOSURE

Damping, to suppress resonances of a piezoelectric transducer, is provided by contacting the face of said transducer with one or more thin fingers of dead elastomeric material lightly touching said transducer only at points of peak resonance amplitude motion. Reliance for damping is placed on the internal resistance of the elastomer rather than on any compressive restraint.

This invention relates to improvements in the mounting of elongated piezoelectric transducer elements in their enclosing cartridge housings and more particularly to improvements in the method and devices for controllably damping the vibrations of the elements. While the principles of the present invention are applicable in microphones and sonic detection devices, for example, the invention has particular utility in the field of phonograph pickup cartridges and will be hereinafter specifically described in such application.

Effective provisions for damping the vibrations of elongated piezoelectric transducer elements is particularly critical when dealing with ceramic elements and in the frequency regions of the resonant range of the elements and the first and second harmonics thereof. Further, the inherent low output or signal levels of ceramic elements requires a minimum of overall impedance in the mechanical fluctuations of the elements when dealing with mechanical stimuli of low amplitude. All of this is necessary to effect the desired sensitivity in the transduction and to achieve a flat response over the usual frequency band without distortion. It is accordingly the primary object of this invention to provide improved mountings for elongated piezoelectric transducer elements which have improved characteristics as regards damping of the vibrations of the elements so as to effectively cancel out the adverse effects of resonance, with harmonics, while yet not impeding the sensitivity of the transductions.

The prior art is replete with various arrangements for damping the vibrations of elongated piezoelectric transducer elements in phonograph pickups and other devices wherein the elements are more or less rigidly clamped at one end and extend outwardly in cantilever relation for actutaion by record-engaging styli. In some constructions substantially the entire extent of the flat and principal surfaces of the elements are overlaid with slightly compressed expanses of soft rubber or other elastomeric materials and it should be understood that if this arrangement is to be effective at the resonant frequencies of the elements, the mechanical impedance at low amplitude will be such as to seriously lessen the sensitivity of the pickup. In other proposals, discrete damping pads are lightly compressed against opposite faces of the transducers at a predetermined location along the lengths of the transducers. This latter arrangement of the prior art, however, still relies on pads of substantial area which impede the overall efficiency of the transducer or transducers and are not placed for adequate restraint of the nodal amplitudes of the transducer or transducers when vibrating in its or their primary and subsequent resonant frequencies. Thus, in the prior art, excessive damping is applied throughout the entire range of frequencies to be transduced in order to achieve an acceptable degree of damping in the primary and successive modes of resonant vibration. This objection is overcome by the principles and structure of the present invention as follows:

In accordance with this invention, the elongated piezoelectric transducer element is lightly contacted at the points or nodes of maximum displacement when vibrating in either its primary or harmonic modes of resonance. Further, the points of contact of the damping strip are achieved by tapered fingers on the strip which have initially substantial line contact with the transducer so that the overall impedance to motion of the transducer is minimal. The material of the fingers, however, is selected for high internal physical resistance so that the damping is more effective at higher frequencies and also so that the damping effect, resulting from the high resistance and the tapering of the fingers, becomes more pronounced with increased amplitude at resonance. Suitable materials for the purpose of the invention such as dead-soft rubber and other elastomers are well known in the art.

The above and other objects and advantages of the invention will be apparent upon consideration of the following description and drawing wherein there are disclosed certain preferred embodiments of the invention.

Figures 1, 2, 3, 4, 5, 6, 7:
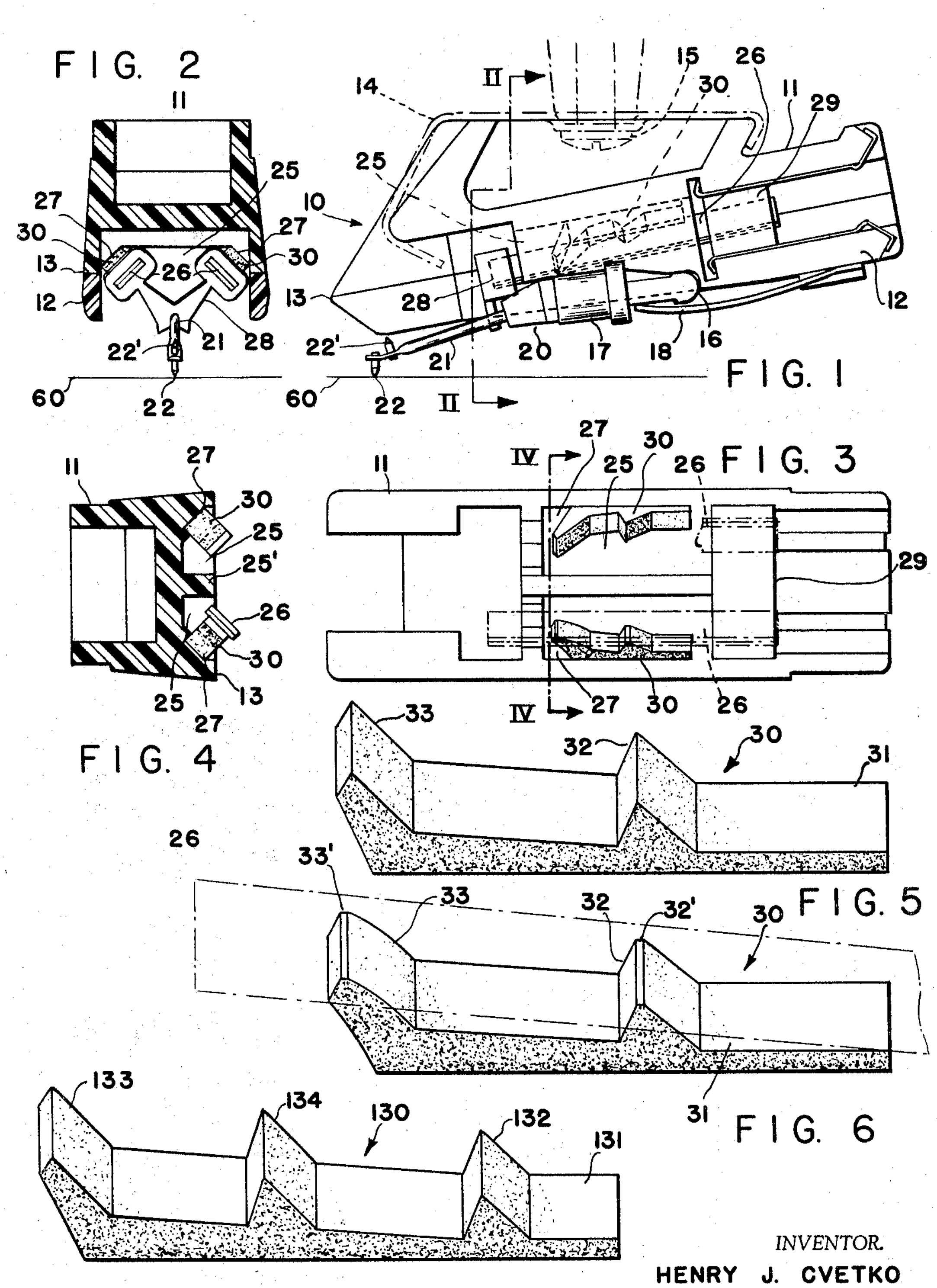
FIGURE 1 is a sectional view taken at the vertical median plane of a phonograph pickup cartridge embodying the novel damper strip of the invention.
FIGURE 2 is a transverse sectional view of the cartridge of FIGURE 1, taken at the line II—II of FIGURE 1.
FIGURE 3 is an elevation of the underside of the top half of the cartridge of FIGURE 1 with certain parts shown in broken lines for clarity of illustration.
FIGURE 4 is a sectional view of the cartridge of FIGURE 3, taken at the line IV—IV of FIGURE 3.
FIGURES 5 and 6 are perspective views of the damper strip of the cartridge of FIGURE 3 in various stages of operation.
FIGURE 7 is a perspective view of a modified form of the damper strip of the invention.

Referring to the drawing more in detail, the reference numeral 10 indicates generally a pickup cartridge housing comprising an upper housing half 11 and a lower housing half 12. Housing halves 11 and 12 abut each other at a parting line 13 and may conveniently be cemented to each other at assembly.

For utilization the entire housing 10 may be supported in a mounting bracket 14 and secured to a phonograph tone arm (not shown) by a screw 15, for example.

Formed in the underside of lower housing 12, a molded recess 16 is provided to rotatably journal a stylus support 17 in a manner disclosed in U.S. Patent 2,848,559 to M. M. Palo. A spring 18 holds the stylus support 17 in recess 16. A rubber bushing 20 flexibly secures a stylus arm 21 to stylus support 17. A pair of stylus tips 22 and 22' are affixed to the forward free end of stylus arm 21, and either of the tips may be brought to bear on an adjacent record surface 60 in usual manner.

Internally of housing 10, cavity 25 is provided to accommodate transducer elements 26. Since the illustrated genus of the invention is a stereo pickup cartridge, two elements 26 are shown, one being used to translate each channel of a stereo signal in well-known manner. Cavity 25 may be divided by a central partition 25' if desired. The upper internal surface of cavity 25 is formed with angularly disposed surfaces 27 at its extreme corners.

Surfaces 27 are arranged confronting each other at an angle of 90° and they lie parallel to the major faces of the two transducer elements 26.

An elastomeric coupling member 28 provides mechanical connection between a portion of stylus arm 21 and the forward free ends of the two transducer elements 26 respectively. Thus the elements 26 may be excited separately by the two separate mechanical signals which are applied to the stylus tip 22 by a stereo record 60.

The right ends of both elements 26 are secured in a common clamp block 29, ideally in the manner disclosed in the copending Cvetko and Punkar application Ser. No. 422,723, filed Dec. 31, 1964, which is assigned to the assignee of the present application. The elements are thus presented as end-clamped cantilever beams which may be acted upon by forces applied to their free ends by the coupling member 28.

The heart of the present invention resides in the damper strips 30 which are disposed between the major top faces of transducer elements 26 and the angularly disposed flats 27 arranged adjacent to each element. Attention is directed to FIGURE 5 for a description of one preferred form of the novel damper strip of the invention.

The damper strip 30 consists of an integral formed piece of elastomer material having relatively high internal resistance. Strip 30 comprises a generally flat base portion 31 adapted to be secured, by cementing, to the flat 27. A tapered finger 32 is formed on the base 31 near its midportion and a much larger and inclined tapered finger 33 is formed at an end of base 31.

The heights of fingers 32 and 33 above the base 31 are made just sufficient to permit their top ends to gently bear against the flat major face of a contiguous transducer element 26. Under very slight initial assembly pressure the condition illustrated in FIGURE 6 is produced. The sharp upper edges of both fingers 32 and 33 are very slightly blunted as at 32′ and 33′ respectively but, due to the intrinsic softness of the elastomer from which they are made and to the very nominal magnitude of the pressures prevailing, this blunting does not indicate compression in the sense of that term's usage in the prior art. The finger 33 curves away from the face of the transducer 26 and is left in an uncompressed state where only its resistive reaction is applied to damp the transducer 26.

The precise positions on the length of transducer 26, at which the fingers 32 and 33 are made to contact it, are ideally chosen to be points of maximum amplitude of motion for the transducer 26 when it is excited to resonance in its second and first modes respectively. Some compromise as to the placement of fingers 32 and 33 is permissible to allow for the operation of other parts, such as coupling member 28, in a satisfactory manner. The prime consideration is to guard against applying compressive forces between the element 26 and the fingers of the damper strip 30, and to apply only the resistive property of the damper strip to suppress unduly high resonant vibrations.

The modification of the damper strip of the present invention illustrated at FIGURE 7 is intended to be used to apply damping to the first three principal modes of vibration of a pizeoelectric transducer, instead of to only the first two modes as in the device of FIGURES 1–6. The damper strip 130 of FIGURE 7 comprises a flat base portion 131 from which rise the tapered fingers 132, 134 and 133. Fingers 132 and 134 are formed generally like finger 32 of the earlier described version, while finger 133 is a longer and inclined finger similar to 33. The placement of the three fingers 132, 133 and 134 will be indicated by the vibrational behavior of the transducer element with which it is to be used, and will follow the well established rules for nodal vibration in driven end-clamped cantilever beams.

It is within the purview of the present invention to extend the effective use of this novel damper strip to any desired number of modes of vibration in a transducer.

It has been found in practice, that proper damping of the first and second modes usually, and the third mode only at times, is required to achieve satisfactory levelling off of the response characteristics of presently used piezoelectric transducers through a useful range of frequencies of interest.

By the logical extension of the teaching of the present invention, it will be evident that any number of damping fingers 32 and 33 may be applied to a transducer. By using a large number of fingers, a damper strip is produced which will behave in much the same fashion as a fluid damper but which will be adjustable from point to point to achieve controllable damping not possible by fluid damping.

From the above description, it should be understood that the present invention relies for its efficacy on the concept of relying on properly located points of application of the damping material coupled with an arrangement whereby the inherent resistance of the material is the dominant factor in the damping rather than on an indiscriminate application of the damping material coupled with prime reliance on the stiffness or mass component (capacitance) of the damping material.

Thus, I have produced a damping means for a transducer cartridge which achieves the objects initially set forth. The application of high internal resistance material formed in the style disclosed at FIGURES 1–6 brings only the resistive property of such material into action to achieve superior damping without mechanically restraining the transducer under compression, the extreme thinness of the fingers 32 and 33, their "knife-edge" bearing against the element 26 and the long flexible nature of the finger 33 all combine to prevent the application of compressive restraint. The inherent high internal damping of the elastomer body 30 is applied to the element 26 at only those highly excited points where mechanical damping is most effective. Further, it will be evident that as transducer element 26 moves through excursions of greater extent, the effectiveness of the damping applied by fingers 32 and 33 will be progressively more pronounced as slightly larger areas of said fingers bear upon the element 26.

Having thus described my invention, what I claim is:

1. In a transducer device, a beam-like piezoelectric transducer element mounted for oscillatory driven motion within a range embracing a plurality of modes of vibration, and damping means comprising a series of tapered elastomer damping fingers having thin edges contacting said transducer element at points of maximum amplitude of motion at said plurality of modes.

2. The construction of claim 1, wherein said fingers are arranged relative to said transducer element so that certain are compressed by transducer motion and certain others are bent by said motion.

3. A phonograph pickup cartridge comprising a casing, an elongated piezoelectric element mounted in said casing for vibration as an end-clamped cantilever beam, means for applying forces to said element in a range of frequencies causing it to vibrate in at least first and second resonant modes, a molded strip of high resistance elastomer material lying in said casing adjacent said element on one side thereof, a plurality of tapered fingers integral with said strip having their thinner ends bearing against said element substantially at points of maximum deflection of said element when vibrated in said first and second modes, whereby damping occurs through bending only of said fingers.

4. In a transducer device the combination of a casing, a beam-like piezoelectric transducer element mounted in said casing for oscillatory driven motion relative to said casing in at least first and second modes of vibration of said element, means for applying said motion at varying frequencies within a band of frequencies to excite said elements in at least said first and second modes, and damping means comprising a series of tapered elastomeric damping fingers each containing a face of said element at a point of maximum amplitude of vibration when said element is excited at said modes, said fingers joined to an integral base and said base being attached to said casing.

5. The device of claim 4 in which said fingers contact said face over an area about said point, which area varies with said amplitude.

6. The device of claim 4 in which certain of said fingers are compressed by said motion and certain of said fingers are bent by said motion.

References Cited

UNITED STATES PATENTS

| | | | |
|---|---|---|---|
| 2,352,311 | 6/1944 | Di Toro | 179—100.41 |
| 2,514,080 | 7/1950 | Mason | 310—8.2 X |
| 2,543,500 | 2/1951 | Kettering et al. | 310—8.2 X |
| 2,862,068 | 11/1958 | Kelly | 179—100.41 |
| 3,060,280 | 10/1962 | Wood | 179—100.41 |

OTHER REFERENCES

Bechman: Suppressing Unwanted Modes, Frequency, December 1963, pp. 18–21.

STANLEY M. URYNOWICZ, Jr., *Primary Examiner.*

R. F. CARDILLO, *Assistant Examiner.*

U.S. Cl. X.R.

310—8.2